United States Patent [19] [11] 3,907,872
Heinert et al. [45] Sept. 23, 1975

[54] ALTERNATING COPOLYMERS OF TRICHLOROETHYLENE IN VINYL ACETATE

[75] Inventors: Dietrich H. Heinert; William E. Broxterman, both of Midland, Mich.

[73] Assignee: The Dow Chemical Company, Midland, Mich.

[22] Filed: Aug. 1, 1973

[21] Appl. No.: 384,660

[52] U.S. Cl. ...... 260/488 J; 260/31.2 R; 260/45.85; 260/482 R; 260/484 R; 260/485 R; 260/486 H; 260/633
[51] Int. Cl.² ......................................... C07C 69/63
[58] Field of Search ............ 260/488 J, 633, 486 H, 260/485 H, 484 R, 482 R

[56] References Cited
OTHER PUBLICATIONS
Alfrey et al., Chem. Abstracts, Vol. 42 (1948) pp. 5258–5259.

Primary Examiner—James A. Patten
Attorney, Agent, or Firm—Richard G. Waterman; Michael S. Jenkins

[57] ABSTRACT

Low molecular weight alternating copolymers of a major amount of trichloroethylene and a minor amount of vinyl acetate are useful as additives to organic polymers such as polyurethane and polyvinylchloride to improve flame retardance and to plasticize the polymers.

2 Claims, No Drawings

ALTERNATING COPOLYMERS OF TRICHLOROETHYLENE IN VINYL ACETATE

BACKGROUND OF THE INVENTION

This invention relates to new and useful copolymers of trichloroethylene and vinyl acetate.

Copolymers of trichloroethylene in vinyl acetate have been disclosed by Alfrey et al. in *Journal of Polymer Science*, Vol. 3, 297–301, (1948). The cited article discloses that trichloroethylene may be copolymerizable with vinyl acetate to form copolymers containing less than 47 mole percent of trichloroethylene. The foregoing reference and other prior art leads to the conclusion that trichloroethylene does not homopolymerize, but does copolymerize with vinyl acetate to produce copolymers having a maximum trichloroethylene content of less than 50 moles percent.

Heretofore, it has not been disclosed nor suggested that trichloroethylene might be copolymerized with vinyl acetate under certain conditions to provide a copolymer having a major amount of trichloroethylene. Nor has it been disclosed that such copolymer would have utility as plasticizers and fire retardant additives.

SUMMARY OF THE INVENTION

In accordance with the present invention, low molecular weight alternating trichloroethylene/vinyl acetate copolymers containing a major amount of trichloroethylene are provided. Surprisingly, it is found that these novel copolymers are superior as plasticizers to those copolymers described in the prior art. In addition to their utility as plasticizers in organic polymers such as polyvinyl chloride, the novel copolymers of the present invention are also useful as fire retardant additives for normally combustible organic polymers such as the polyurethanes wherein the copolymers are completely miscible with the urethane component.

DESCRIPTION OF THE PREFERRED EMBODIMENTS

The copolymers of the present invention contain from about 50 to about 66.7 mole percent of trichloroethylene and from about 33.3 to about 50 mole percent of vinyl acetate and have a molecular weight in the range of from about 300 to about 6,000. Especially preferred copolymers contain from about 57 to about 66.7 mole percent of trichloroethylene and from about 33.3 to about 43 mole percent of vinyl acetate and have a molecular weight in the range from about 300 to about 2,500. It is further understood that a portion or all of the vinyl acetate moiety of the copolymer may be hydrolyzed to vinyl alcohol moiety. The hydroxyl group of the vinyl alcohol can be reacted with various materials, such as maleic anhydride to give a maleic acid half ester or other carboxylic acid, or carboxylic acid chlorides to give esters of various types. Exemplary carboxylic acids include ethylenically unsaturated acids such as acrylic acid, methacrylic acid, fumaric acid, itaconic acid, maleic acid, citraconic acid, aconitic acid and the like as well as saturated acid such as propionic and butanoic acid and various hydroxycarboxylic acids such as lactic acid and hydracrylic acid and amino carboxylic acids such as 3-aminopropanoic acid and 6-aminohexanoic acid.

Study of the copolymers by various analytical techniques reveals that the copolymers contain alternating units of trichloroethylene and vinyl acetate in the copolymer backbone, and further that the copolymers contain large portions of molecules corresponding to the formula $[(TCE)_{n+1}(VOAc)_n]$ wherein TCE represents trichloroethylene and VOAc represents vinyl acetate. Analytical techniques for determining molecular weight show the presence of distinct oligomers, i.e., copolymers with degrees of polymerization below 10, having molecular weights which correspond to the addition of monomer units in accordance with the above general formula beginning with the lowest member of $n=1$. In actuality, the copolymers of the present invention are believed to be mixtures of a major portion of the distinct oligomers described hereinbefore, a minor portion of oligomers having the formula $[(TCE)\cdot(UOAC)]_n$, and a still smaller portion of oligomers of the composition $[(TCE)_n(VOAc)_{n+1}]$ wherein $n$ is 1 to 10.

These copolymers may be prepared by subjecting a monomeric mixture consisting essentially of trichloroethylene and vinyl acetate to free radical polymerization conditions. Preferably, the free radical polymerization conditions comprise copolymerization of monomeric mixtures of from about 66 to about 99 mole percent of trichloroethylene and from about 1 to about 34 mole percent of vinyl acetate in the presence of free radical catalyst in concentrations from about 0.5 to about 2.5 weight percent based on monomeric mixture using reaction temperatures in the range from about 70° to about 120°C. While it is not intended that this invention be limited by any particular method of polymer formation, it is believed that the copolymers of the present invention are formed by an unusual chain transfer mechanism in which the chain transfer occurs by chlorine abstraction from terminal trichloroethylene units and the new polymer chain are started by the resultant trichloroethylene radicals. Thus each copolymer molecule of this type would begin and end with a trichloroethylene moiety.

Exemplary free-radical catalysts utilized in the practice of this invention include azo compounds such as azobisisobutyronitrile and organic peroxygen compounds such as lauryl peroxide, benzoyl peroxide, acetyl peroxide, dicumene peroxide, isopropyl percarbonate, t-butyl peroxyprivalate and low temperature activated peroxide compositions.

The monomeric materials to be polymerized may be dissolved in any solvent conventionally used for free radical solution polymerization or it may be dissolved in excess trichloroethylene comonomer. Preferably, the monomeric material being polymerized by this process, constitutes from about 30 to 100 percent and most preferably from about 80 to 100 percent of the total weight of the monomeric solution.

Exemplary organic polymers to which the foregoing copolymers may be added for the purpose of plasticizing or rendering fire retardant include α-monoolefin polymers such as polyethylene, polypropylene, polyisobutylene, and homopolymers and copolymers of α-monoolefins having from 2 to 10 carbon atoms; polymers of olefinic halogens such as polyvinylchloride and vinyl chloride copolymers, polyvinylidene chloride and vinylidene chloride copolymers and the like; polymers containing urethane linkages such as polyurethane; polymers of monovinylidene aromatic monomers such as polystyrene and styrene copolymers and the like.

The aforementioned low molecular weight copolymers of trichloroethylene and vinyl acetate are added to the foregoing organic polymers in amounts sufficient to render them flame retardant and/or to plasticize them. Generally amounts sufficient to plasticize the foregoing organic polymers depend upon the particular polymer being plasticized and the degree of plasticization desired. However, amounts in the range of from about 10 to about 60 weight percent of the low molecular weight copolymer based on the organic polymer are advantageously employed, preferably from about 10 to about 30 weight percent. Similarly, the amount of the copolymer required to improve fire retardance of the organic polymer are generally within the range from about 1 to about 50 weight percent of the copolymer based on the normally combustible organic polymer.

Further, it is understood that the copolymers of the invention may be used as a replacement for a part or all of the conventional plasticizers in vinyl chloride polymers without deleteriously affecting the non-burning characteristics of such polymers. This is in sharp contrast to conventional plasticizers such as the dialkylphthalates which appreciably lower the resistance of vinyl chloride polymers to burning.

The following examples are given to illustrate the invention and should not be construed as limiting its scope. All parts and percentages are by weight unless otherwise indicated.

EXAMPLE 1

Preparation of Low Molecular Weight Copolymer of Trichloroethylene and Vinyl Acetate To a nitrogen filled 250 ml-round bottom flask equipped with nitrogen inlet tube, magnetic stirring bar and reflux condenser which is in turn connected to a mercury trap are added 262.8 g (2.00 mole) of trichloroethylene, 21.52 g (0.25 mole) of redistilled vinyl acetate and 3.52 g ($1.45 \times 10^{-2}$ mole) of benzoyl peroxide. The mixture is then heated to 70°C and stirred at that temperature for 17 hours. After this period of heating, the unreacted trichloroethylene and vinyl acetate are removed from the polymerization product by heating under vacuum. The resultant product, a colorless liquid of high viscosity (pourable at room temperature), weighs 52.8 g.

A nuclear magnetic resonance spectrum of the resultant product indicates an alternating copolymer of trichloroethylene and vinyl acetate. Analysis of the reaction product for molecular weight by gel permeation chromatography indicates an average molecular weight of approximately 800. Elemental analysis of the resultant product yields the following results: %C = 31.88, 31.95; % H = 2.69, 2.71; %Cl = 55.38, 55.40, thus indicating 58.7 mole percent (68.4 percent by weight) of trichloroethylene in the copolymer product. Using the foregoing data, the average composition of the reaction product is calculated and found to be $(TCE)_{4.2}(VOAc)_{2.9}$ having an average degree of polymerization of 7.1.

The foregoing reaction product is further fractionated by dissolving 20 g of the copolymer product in 40 ml of dry tetrahydrofuran and then adding this solution slowly to 400 ml of n-hexane while vigorously stirring the mixture in a Waring Blendor. A 3-g portion of a white precipitate is recovered, and analysis by gel permeation chromatography indicates that the precipitated solid has an average molecular weight of 1600. After evaporation of hexane and other volatile solvents from the filtrate, analysis of the remaining viscous liquid copolymer (14.4 g) by gel permeation chromatography indicates an average molecular weight of 640 and a trichloroethylene content of 63 mole percent (74 weight percent) as determined by nuclear magnetic resonance analysis.

Blends of Polyvinyl Chloride and Copolymer

Into an oil-heated Brabender mixer equipped with fusion head and roller blades are fed 100 parts of polyvinyl chloride, 60 parts of dioctyl phthalate andn 45 parts of the copolymer either having a molecular weight of 800 or 640. The ingredients are then blended on the Brabender at 150°C and 60 rpm for 5 minutes. The resultant blended samples are then removed from the Brabender, placed in a stainless steel molding from having a ⅛ inch thickness which is sandwiched between polyethylene terephthalate sheets which are in turn sandwiched between polished stainless steel plates. The molding is effected on a steam-heated press at 150°C and 20,000 psi for 2 minutes. The resulting samples including the copolymer (either MW 800 or MW 640) possess improved flexibility and fire retardance when compared to blended samples of 100 parts of polyvinyl chloride with 60 parts of dioctyl phthalate.

EXAMPLE 2

A copolymer of 60.5 mole percent of trichloroethylene and 39.5 mole percent of vinyl acetate having an average molecular weight of 720 as determined by boiling point elevation (ebullioscopically) is prepared by the general procedure set forth in Example 1 with the exception that 19.71 Kg of trichloroethylene and 1.614 Kg of vinyl acetate are reacted in the presence of 264 g of benzoyl peroxide in a 22-liter glass reactor equipped with stirrer, reflux condenser, external heater and internal stainless steel cooling coils.

The resultant copolymer (4.48 Kg) is recovered, dried under vacuum, and blended with polyvinyl chloride and molded into samples (2 × 6 × ⅛ inches) following the procedure set forth in Example 1. The resulting samples are tested for fire retardance, hardness, and flexibility and the results are recorded in Table I.

For the purpose of comparison, a trichloroethylene/vinyl acetate copolymer as disclosed by the prior art is similarly blended with polyvinyl chloride, molded into samples (2 × 6 × ⅛ inches) and tested for fire retardance, hardness and flexibility. The results of these tests are recorded in Table I.

TABLE I

| Sample No. | Copolymer (1) TCE/VOAc mol. % | Amt. pph | Mol. wt. | LOI Index (2) | Shore A-2 Hardness (3) | Flexural Modulus (4), psi |
|---|---|---|---|---|---|---|
| 1 | 60.5/39.5 | 45 | 720 | 0.25 | 84 | 900 |
| A* | 47.5/52.5 | 53 | 1270 | 0.24 | 88 | 1485 |
| C* | — | 0 | — | 0.22 | 86 | 1467 |

* Not an example of the invention.
(1) TCE - Trichloroethylene and VOAc - Vinyl acetate; Mol: wt. - average molecular weight as determined by gel permeation chromotography; Amt. pph - amount of copolymer in parts per hundred parts of polyvinyl chloride.
(2) LOI - Limited oxygen index as determined by ASTM D-2863.
(3) ASTM D-2240.
(4) ASTM D-790.

as evidenced by the results of Table I, the low molecular weight copolymers of the present invention are superior as plasticizers to those disclosed by the prior art.

EXAMPLE 3

A 100-part portion of the copolymer described in Example 2 is blended at room temperature with 100 parts of toluene diisocyanate (an 80/20% mixture of the 2,4- and 2,6- isomers) until a homogeneous liquid solution results (in about 2–3 minutes). The copolymer solution is then combined with 100 parts of tri(hydroxypropyl)ester of glycerine having an average molecular weight of about 260 and 1 part of stannous octoate catalyst. The resultant combination is poured into a stainless steel mold and polymerizes spontaneously to a solid sample (6 × 7 × ¼ inches) of polyurethane elastoplastic (cross-linked resin) in less than 1 minute. The mold has been preheated in an oven to 60°C. The molded sample is removed, cut into ½ inches wide × 5 inches long bands, and tested for flame retardance by the following procedure:

A flame is applied to one end of the bar at an angle of 90° for a period of 60 seconds. The flame is removed and the time from first application of the flame until the flame burns 5 inches of sample or is extinguished before burning 5 inches of sample is recorded (ASTM D-1692-68).

The foregoing sample when tested by this method self-extinguishes within 77 seconds with 1.9 cm of sample being burned.

For the purpose of comparison, a control sample is prepared from the toluene diisocyanate and tris(hydroxypropyl)glycerine without the copolymer additive and tested by the foregoing method for flame retardancy. When tested by this method, the entire 12.7 cm of the control sample burns.

Also for purposes of comparison, a 100-part portion of trichloroethylene/vinyl acetate copolymer containing 47.5 mole percent trichloroethylene and 52.5 mole percent vinyl acetate and having an average molecular weight of 1270 is similarly blended with 100 parts of toluene diisocyanate. The resultant blend must be heated for a substantial period of time at 60°–70°C to effect dissolution of the copolymer in the toluene diisocyanate. The copolymer solution is reacted with tris(hydroxypropyl)glycerine to provide a polyurethane coating and a sample thereof is tested for flame retardance in accordance with the instant example. This sample self-extinguishes within 104 seconds with 2.5 cm of the sample being burned. Surprisingly, the burning time for the samples is about 35% longer than the burning time of the previously described sample of this example.

What is claimed is:

1. A copolymer consisting essentially of from about 57 to about 66.7 mole percent of trichloroethylene and from about 33.3 to about 43 mole percent of vinyl acetate in which from 0 to 100 percent of the copolymerized vinyl acetate is hydrolyzed to vinyl alcohol or hydrolyzed and then reesterified with a carboxylic acid, selected from the group consisting of acrylic acid, methacrylic acid, fumaric acid, itaconic acid, maleic acid, citraconic acid, aconitic acid, propionic acid, butanoic acid, lactic acid, hydroacrylic acid, 3-aminopropanoic acid and 6-aminohexanoic acid, said copolymer having a molecular weight as determined by boiling point elevation in the range from about 300 to about 6,000.

2. The copolymer of claim 1 containing in copolymerized form from about 57 to about 66.7 mole percent of trichloroethylene and from about 33.3 to about 43 mole percent of vinyl acetate and having a molecular weight in the range from about 300 to about 2500.

* * * * *